(No Model.)

H. R. HAMMOND.
SAFETY SNAP HOOK.

No. 306,917. Patented Oct. 21, 1884.

WITNESSES:
Francis McArdle
C. Sedgwick

INVENTOR:
H. R. Hammond
BY Munn & Co.
ATTORNEYS.

UNITED STATES PATENT OFFICE.

HENRY REUBEN HAMMOND, OF FOSTER CENTRE, RHODE ISLAND.

SAFETY SNAP-HOOK.

SPECIFICATION forming part of Letters Patent No. 306,917, dated October 21, 1884.

Application filed April 28, 1884. (No model.)

*To all whom it may concern:*

Be it known that I, HENRY R. HAMMOND, of Foster Centre, in the county of Providence and State of Rhode Island, have invented a new and Improved Safety Snap-Hook, of which the following is a full, clear, and exact description.

The object of my invention is to provide an improved safety snap-hook which may be readily operated by hand, but which cannot become accidentally detached.

My invention consists of a snap-hook provided with a pivoted and notched latch and a sliding and spring-pressed bolt having a hook engaging the notch of the said bolt, all as hereinafter fully described.

Reference is to be had to the accompanying drawings, forming part of this specification, in which similar letters of reference indicate corresponding parts in all the figures.

Figure 1:
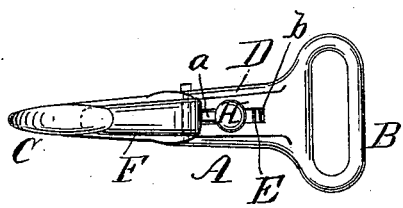
Figure 2:
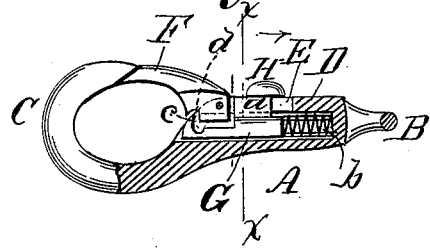
Figure 3:
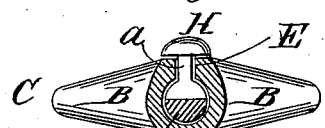
Figure 4:
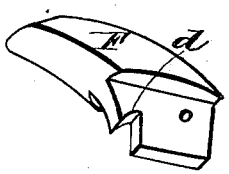
Figure 5:
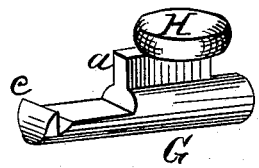

Figure 1 is a front elevation of my improved safety snap-hook. Fig. 2 is a side elevation, partly in section. Fig. 3 is a transverse section taken on line $x\,x$ in Fig. 2. Fig. 4 is an enlarged perspective view of the pivoted latch, and Fig. 5 is a similar view of the sliding bolt.

The body A of the snap hook is provided with the usual loop, B, for receiving a strap, and with a hook, C, for receiving a ring or loop, and the shank D thereof is bored axially from the hook end toward the loop end, but not entirely through. A slot, E, is formed in the side of the shank in line with the end of the hook C, and in the said slot is pivoted a latch, F, whose beveled free end is capable of touching the beveled inner surface of the end of the hook C.

In the bore of the shank D is placed a bolt, G, having a feather, $a$, projecting through the slot E, and carrying a thumb-piece, H, by which the bolt is moved. A spiral spring, $b$, placed in the bottom of the bore of the shank D, tends to press the bolt G forward toward the hook C.

A portion of the outer end of the bolt G is cut away, leaving a hook, $c$, which enters a notch, $d$, formed in the latch F. The spring $b$, acting through the bolt G, closes the latch F against the end of the hook C, and the hook $c$, when in engagement with the latch at the beveled side of the notch $d$, acts as a wedge underneath the latch and prevents it from being pressed inward. When it is desired to open the latch, the bolt is moved toward the loop B, and the engagement of the hook $c$ with the shoulder at the side of the notch $d$ in the latch F opens it. When the bolt G is released, the spring $b$ pushes the bolt forward and the latch is closed automatically.

Having thus fully described my invention, I claim as new and desire to secure by Letters Patent—

1. In a snap-hook, the combination, with a pivoted and notched latch, of a sliding and spring-pressed bolt provided with a hook engaging the notch of the said latch, substantially as herein shown and described.

2. In a snap-hook, the combination, with the shank D, bored axially, and provided with the slot E, of the spring-acted bolt G, having the feather $a$, and provided with the hook $c$, and the pivoted latch F, having the notch $d$, as herein described.

HENRY REUBEN HAMMOND.

Witnesses:
HENRY ARNOLD,
MARCIA ARNOLD.